United States Patent Office 2,719,792
Patented Oct. 4, 1955

2,719,792
DEHYDRATED WHOLE MILK PRODUCT AND THE PROCESS OF PRODUCING THE SAME

Jackson H. Rollins, Toledo, and Harry R. Turner, Bluffton, Ohio

No Drawing. Application August 14, 1951, Serial No. 241,878

9 Claims. (Cl. 99—56)

This invention relates to the production of milk products, particularly dehydrated whole milk.

A primary purpose of this invention is the production of a stable milk product in the form of small granules or pellets, wherein all the fats as well as the solids non-fat are retained within the powder, so that when correct proportions of the powder and water are mixed, the resultant fluid will be the equivalent of whole fresh liquid milk from which said material was processed.

An additional object of this invention is the production of a dry whole milk powder retaining all the milk solids therein in their original proportions.

Another object of this invention is to provide a method of reducing liquid whole milk to a dry powder suitable for quantity or commercial production.

And another object of this invention is the method of shielding the product during its production and its storage prior to use, against deterioration by oxidation or other possible contamination.

Other objects and advantages of this invention relating to the procedure, operations and functions of the related steps in the process, to various details of procedure, to combinations of steps and to economies of manufacture, will be apparent to those skilled in the art upon consideration of the following description and appended claims, reference being had to the details described within the specification wherein materials, conditions and quantities designated are but typical examples available having the desired characteristics, while the conditions and quantities are subject to variations as is the process program.

Whole fresh milk is collected into a sufficient or workable quantity and may be a collection from various sources such as from different herds or farms or dairies. The collected volume is first run through a separator to isolate the cream or fat content from the remaining liquid, the skimmed milk which retains the solids not fat. The cream is corrected to approximate 40% fat content.

A separate solution is prepared by boiling rice in water in the proportion of one pound of rice to each gallon of water. The solution is boiled until the volume is reduced one-fourth or for each gallon of water, the resultant volume is three quarts. During such boiling, substantially all the starch grains have been ruptured or burst so that the resultant liquid is somewhat viscous.

Three quarts of the starch solution is next mixed into five gallons of the 40% cream and this mixture allowed to stand at room temperatures for a period of twelve hours. This latter mixture is then mixed with a sufficient quantity of the skimmed milk to produce sixteen gallons. A small amount of one of the "water-softening" phosphates may be added to the skimmed milk to promote a thorough mixing of the ingredients, the phosphate serving as a wetting agent. The choice of phosphate may be one selected from those which are tasteless and non-toxic and the quantity but a fraction of one per cent of the skimmed milk volume.

The resultant mixture is a homogeneous solution and will remain so for a time sufficient to continue the process.

The following steps embody heating the mixture to 180° F. and delivering the same under pressure through jets into a heated chamber charged with an inert gas. The pressure mentioned is preferably of a magnitude of 2,500 p. s. i. and the inert gas primarily nitrogen diluted with approximately 5% carbon dioxide. This provides for a complete atomization of the liquid within a preservative atmosphere wherein it is reduced to "dry" milk or more exactly, to a powder having about 3% water content.

At this time, the product has the appearance of a dry white or slightly cream colored powder, the grains of which will practically all pass through an eighty mesh screen. Any residue of larger granules or pellets may be ground, crushed or otherwise reduced to at least the eighty mesh size to provide a uniform product.

The powder is then spread into a shallow bed preferably on a conveyor and sprayed with a concentrated solution of milk sugar, tapioca starch, methyl cellulose or a combination thereof, which coacts the granular elements of the dehydrated milk. Other similar coating may be employed providing they are edible and suitable for human consumption.

The initial mix of the cream and the starch solution allows the starch to absorb the fat globules and thereby retard any oxidation of the fats while the inert atmosphere in the reducing chamber, which atmosphere is maintained about the product from this stage on throughout the remainder of the process, also tends to additionally defeat oxidation, as well as prevent bacterial attack.

When the whole milk pellets have been coated, they are packed in predetermined quantity moisture-proof and gas tight containers also charged with the inert atmosphere and such product will remain constant for an indefinite period of time.

By the operation of this process, each granule or pellet contains the identical ratio of milk solids, both fat and non-fat, as was present in the fresh milk from which the dehydrated powder was prepared and hence a mixing with the proper volume of water will produce a liquid with all the characteristics and properties of the original whole milk.

The fats are so protected that oxidation thereof is defeated even during long term storage under adverse conditions.

An examination of each grain of the product shows the same solids ratio contained therein as was in the whole milk.

Heretofore, the dehydrating and storage of skimmed milk powder has been practicable and not difficult to accomplish, but to retain the fat content, particularly in normal proportions, has been the problem herein solved not only for commerical production but for storage and transportation thereof.

What is claimed and desired to secure by United States Letters Patent is:

1. In a process for dehydrating whole milk to produce a stable powder which retains all the milk solids both fat and non-fat, the steps including separating fresh liquid whole milk into cream and skimmed milk, adding starch to said cream in a sufficient quantity to absorb substantially all of the fat content of the cream, remixing said cream-starch solution with the skimmed milk, drying said re-mix to a powder, and sealing the grains of said powder within a coating of an edible water soluble material consisting of tapioca starch, methyl cellulose, milk sugar and mixtures thereof.

2. A dehydrated milk product of granular form comprising starch pellets having all the milk solids combined therein in the same ratio as in the whole fresh milk from which said product was produced, and an edible preservative coating about the individual pellets, said coating consisting of a mixture having its ingredients selected from tapioca starch, methyl cellulose and milk sugar.

3. A food pellet comprising a body of water soluble starch, milk solids both fat and non-fat distributed within said pellet in the same ratio as normally found in whole fresh milk, and an edible protective coating completely encasing said pellet, said coating consisting of a material selected from tapioca starch, methyl cellulose, milk sugar or mixtures thereof.

4. In a process for producing whole milk powder, the steps of collecting whole fresh milk, separating said whole fresh milk into bodies of cream and skimmed milk, mixing a solution of ruptured starch grains into said cream, the solution of starch being approximately one pound of starch to three quarts of water and this solution being mixed with approximately five gallons of the cream, the cream-starch solution remixed with substantially sixteen gallons of the skimmed milk, dehydrating said latter mix to about 3% water content which reduces the material to powder form, and coating the individual grains of said powder with an edible coating, said coating being a material consisting of tapioca starch, methyl cellulose, milk sugar and mixtures thereof.

5. The method set forth in claim 1 wherein said drying is consummated within an inert atmosphere.

6. The method set forth in claim 1 wherein said drying and the subsequent steps of production are consummated within an inert atmosphere consisting of approximately 95% nitrogen and 5% carbon dioxide.

7. The method set forth in claim 1 wherein the skimmed milk has about ½% of a phosphate added thereto as a wetting agent for aiding the subsequent remix with said cream.

8. The method set forth in claim 1 wherein the starch is obtained by boiling raw rice in water until substantially all the starch grains have ruptured.

9. A whole milk powder comprising a whole milk-starch mixture, the starch granules embedding the milk solids having the same ratio of skim milk solids to milk fat as were within the whole milk from which said powder is produced, and a coating for the individual granules selected from the group including tapioca starch, methyl cellulose, milk sugar or mixtures thereof.

References Cited in the file of this patent

UNITED STATES PATENTS

| Number | Name | Date |
|---|---|---|
| 1,532,005 | Haselen | Mar. 31, 1925 |
| 1,554,151 | White | Sept. 15, 1925 |
| 2,273,469 | Ingle | Feb. 17, 1942 |
| 2,480,103 | Fux | Aug. 30, 1949 |
| 2,501,406 | Nordenskjold et al. | Mar. 21, 1950 |
| 2,555,467 | Bogin | June 5, 1951 |